Nov. 2, 1965 J. W. MURPHY 3,215,768

FLEXIBLE WIRE AND CABLE SHIELDING

Filed Sept. 23, 1963 2 Sheets-Sheet 1

INVENTOR.
JOSEPH W. MURPHY
BY Edward A. Sokolski
ATTORNEY

Nov. 2, 1965 J. W. MURPHY 3,215,768

FLEXIBLE WIRE AND CABLE SHIELDING

Filed Sept. 23, 1963 2 Sheets-Sheet 2

INVENTOR.
JOSEPH W. MURPHY

BY Edward A. Sokolski
ATTORNEY

United States Patent Office 3,215,768
Patented Nov. 2, 1965

3,215,768
FLEXIBLE WIRE AND CABLE SHIELDING
Joseph W. Murphy, Los Angeles, Calif., assignor to Northrop Corporation, Beverly Hills, Calif., a corporation of California
Filed Sept. 23, 1963, Ser. No. 310,656
6 Claims. (Cl. 174—36)

Figure 1:
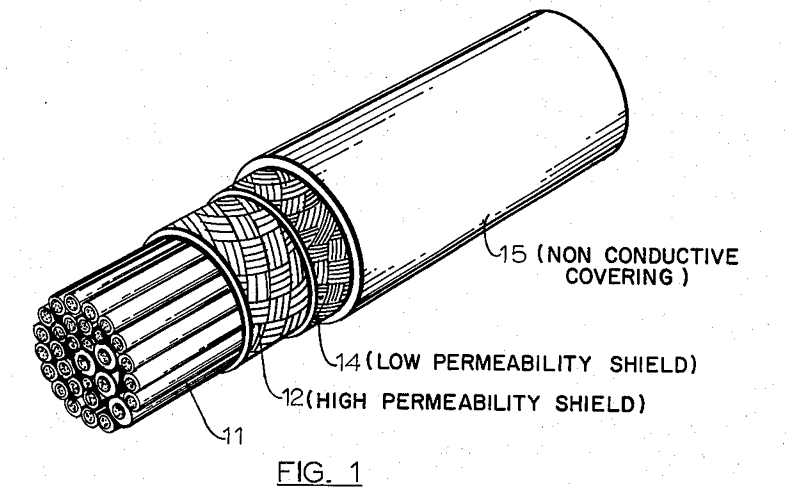

This invention relates to flexible wire and cable shielding and more particularly to such shielding effective against electro-magnetic interference throughout the electro-magnetic spectrum from D.C. to microwave frequencies.

It is well known in the prior art that high frequency electro-magnetic interference can be effectively shielded by means of a shield fabricated of a highly electrically conductive material such as copper. Thus, flexible coaxial cables utilizing braided copper shields are used extensively in radio frequency cables. High frequency shielding is generally most effectively accomplished by utilizing a highly conductive material such as copper or aluminum which is non-magnetic in its characteristics. Such a shield while completely effective at high frequencies has little effect in shielding out electro-magnetic interference at low frequencies (i.e. below 100 kc.).

Thus, ordinary RF or electrical cables, are relatively ineffective in shielding against low frequency interference signals as might be caused by power equipment and the like. With the RF or electrical cables of the prior art, therefore, considerable difficulty is experienced with spurious low frequency interference which might, for example, be emitted from power cables. Such interference can result in serious malfunctioning of the equipment with which the ineffectively shielded cable is utilized. Low frequency interference can be eliminated by utilizing a shielding fabricated of a high permeability magnetic material. Cables therefore have been utilized which include two layer shields, one of these being of high permeability magnetic material, the other being of a highly conductive material such as copper. It has been found, however, that a shield fabricated of high permeability material while completely effective against very low level interfering signals at low frequencies tends to saturate as the amplitude of such signals increases and when saturated completely loses its effectivity in shielding against such low frequency signals.

The device of this invention overcomes the shortcomings of the prior art in providing a flexible shielding for use with wire and cables which effectively shields against high and low frequency interference signals and which is not subject to saturation by the low frequency signals.

The desired end result is achieved in the device of the invention by utilizing at least two layers of shielding, one of these layers being fabricated of a material having relatively low permeability and moderately good electrical conductivity, the other of these layers being fabricated of material having relatively high permeability. The relatively low permeability layer is placed towards the radiating source to be shielded against, that is on the outside where the conductors in the cable are to be protected from an external source and on the inside when the shielded cable itself is carrying the undesired radiation signals. The low permeability shielding layer is relatively unsaturable and substantially attenuates low frequency interference signals. The high permeability shielding layer is subjected to attenuated relatively low level low frequency interference signals and is capable of providing substantially complete shielding against such signals. Substantially no low frequency signals pass through the combined shielding layers. The relatively low permeability shielding layer being a moderately good electrical conductor also provides substantial attenuation to high frequency interference signals. Thus, effective shielding is provided at both high and low frequencies.

In one embodiment of the invention, the innermost and outermost layers are both of a relatively low permeability material having moderately good conductivity, with layers having high permeability sandwiched therebetween. With this type of shielding configuration, shielding against low frequency signals is effective both from the inside out and the outside in. In conjunction with this second embodiment, a unique method is described for preparing and installing such shielding expeditiously in the field over preexisting cables.

It is therefore an object of this invention to provide an improved flexible shielding for wires and cables.

It is a further object of this invention to provide a flexible shielding for wires and cables capable of simultaneously shielding against both high and low frequency interference signals.

It is still a further object of this invention to provide a flexible shielding for wires and cables having better shielding capabilities at low frequencies than prior art devices.

It is still another object of this invention to provide an improved method for installing electro-magnetic shielding in the field.

It is still a further object of this invention to provide an improved flexible shielding for wires and cables capable of providing bi-directional shielding against low frequency electro-magnetic interference.

Other objects of this invention will become apparent from the following description taken in connection with the accompanying drawings, of which—

Figure 2:
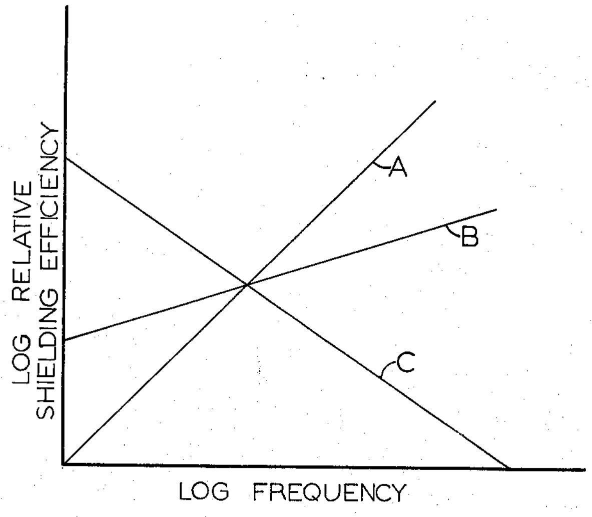
Figure 3:
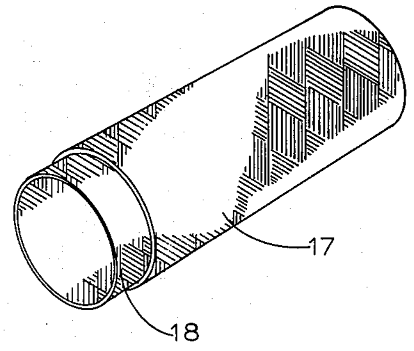
Figures 4, 5:
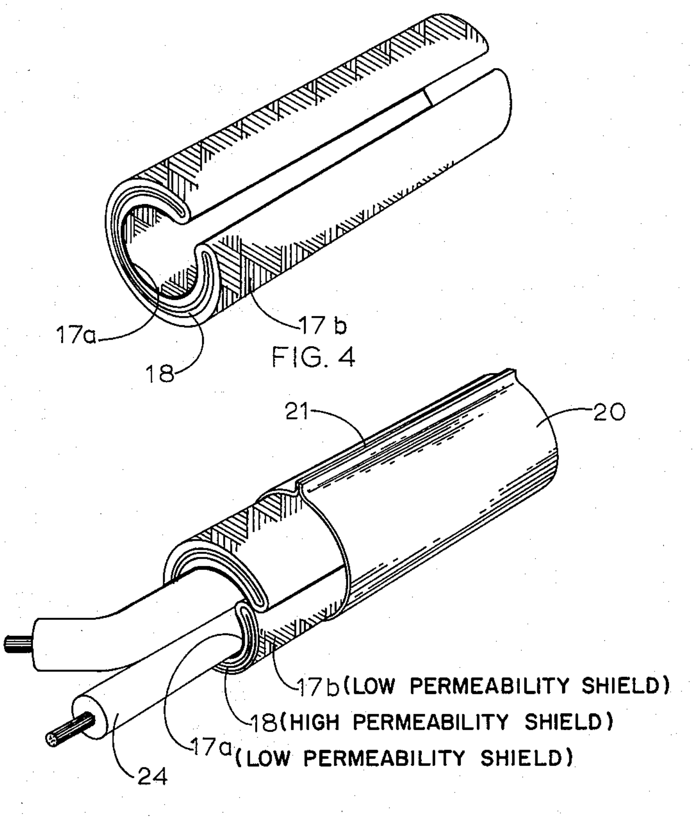

FIG. 1 is a perspective view of a first embodiment of the device of the invention, FIG. 2 is a graph illustrating the characteristics of the shielding layers utilized in the device of the invention, and FIGS. 3, 4, and 5 are perspective views illustrating the field installation of a second embodiment of the device of the invention.

Referring now to FIG. 1, a first embodiment of the device of the invention is illustrated. As shown in FIG. 1, a group of wires 11 is formed into a cable with a first shielding layer 12, a second shielding layer 14, and a non-conductive protective covering 15 which may be of plastic. Shielding layers 12 and 14 are braided and preferably have their wire elements meshed as tightly as possible. If the shielding is to be utilized to prevent electro-magnetic interference at both high and low frequencies from penetrating through to wires 11 from the outside, then outer shielding layer 14 should be of material having a relatively low permeability and a moderately low electrical resistivity such, as pure iron and inner layer 12 should be of a material having a relatively high permeability. It has been found that shielding made of substantially pure iron, such as, for example, Armco iron functions well as the outer shield in such situations while permalloy which is 79% nickel, 4% molybdenum and the balance substantially iron operates most satisfactorily for the high permeability shield. If the shielding is to be utilized to prevent electro-magnetic interference from signals present in wires 11, then the inner layer 12 should be of relatively low permeability material and the outer layer 14 of relatively high permeability material. In any event the relatively low permeability layer should be closest to the interference source.

Referring to FIG. 2, a graph illustrating the general characteristics of the shielding layers utilized in the device of the invention is shown. Graph line A shows the characteristics of shielding fabricated of a highly conductive paramagnetic material such as copper. As can be seen, such a shielding layer has very little shielding effect at low frequencies. Graph line B illustrates the characteristics of a shielding layer fabricated of a material having low permeability and moderately good conductivity such as the iron utilized for the low permeability layer in the device of the invention. As can be seen, this material provides moderate shielding at low frequencies and good shielding at high frequencies. Graph C illustrates the shielding characteristics of a material having high permeability such as supermalloy or permalloy which may be utilized for the high permeability layer in the device of the invention. As can be seen, this material provides very little shielding at high frequencies but excellent shielding at low frequencies. Shielding layers having the general characteristics indicated by graph lines B and C are utilized in the device of the invention to provide shielding effective throughout the entire electro-magnetic interference spectrum.

Tests made of actual embodiments of the device of the invention as shown in FIG. 1 indicate that the relatively low permeability layer, which has a high magnetic saturation point and a moderately high electrical conductivity, attenuates low frequency signals substantially and is also an effective shield against high frequency signals. The low frequency signals are so attenuated by the relatively low permeability layer that they are of insufficient intensity to saturate the relatively high permeability layer which, as noted, has a low saturation point. The relatively high permeability layer is therefore capable of almost completely attenuating whatever low frequency interference signals are still present.

Referring now to FIG. 5, a second embodiment of the device of the invention is illustrated. This embodiment is equally effective for shielding in both directions, i.e. for shielding against interference signals present in the wire conductors within the cable and for preventing interference signals from the outside from reaching the cable wires 24. This end result is achieved by utilizing an inner layer **17*a* and an outer layer 17*b* both of which are fabricated of the same material having low permeability and good electrical conductivity. Sandwiched between layers 17*a* and 17*b* is a double folded layer 18 of high permeability material. Layers 17*a* and 17*b* may be of the same material as described in connection with FIG. 1 for the low permeability material, i.e. an iron such as Armco iron. Similarly layers 18 may be of a high permeability material such as supermalloy or permalloy. A plastic protective covering 20** is utilized to enclose the cable and to tightly hold the overlapping ends of the shielding layers against each other to provide good electrical continuity.

While the embodiment as shown in FIG. 5 may be prefabricated similarly to the embodiment of FIG. 1, this embodiment is especially suitable for installation in the field to shield cables or wires which are already installed and require such shielding to eliminate electro-magnetic interference. A simple yet highly effective means for accomplishing such shielding in the field is illustrated in FIGS. 3–5. Shielding layers 17 and 18 may be initially fabricated on a mandrel (not shown) in concentric cylindrical form with low permeability layer 17 on the outside and high permeability layer 18 on the inside as shown in FIG. 3. The concentric cylinders thus formed are then compressed and rolled to form an open cylinder with low permeability layers **17*a* and 17*b* on the inside and outside and high permeability layers 18 therebetween as shown in FIG. 4. The open cylinder formed in FIG. 4 is then placed around the wires to be shielded 24 with their ends overlapping as shown in FIG. 5. For effective shielding, the ends of the cylinder formed should overlap to provide good metal to metal contact between the overlapping ends. The amount of overlapping can be varied depending on the size of the cable to be shielded. Finally, the shielding is held in place and protected by means of plastic covering 20. Plastic covering 20 is placed around the shielding as shown in FIG. 5 and the edges thereof 21** heat sealed together to form an integral unit. In this manner, a completely effective shield against electro-magnetic interference at both high and low frequencies can be simply installed in the field. A given size shielding member can be utilized with different size cables by varying the amount of overlap to provide a tightly fitted unit.

The device of this invention thus provides a simple yet highly effective shielding against both high and low frequency interfering signals which is readily adaptable for field installation to provide bi-directional shielding action.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a cable having at least one electrical wire running therein, a first electro-magnetic shielding layer surrounding said wire, said first layer being fabricated of a magnetic material having relatively low permeability and relatively good conductivity, and a second shielding layer concentric with said first layer, said second layer being fabricated of a magnetic material having relatively high permeability, said shielding layers being comprised of braided wire.

2. The cable as recited in claim 1 wherein said first layer is fabricated of substantially pure iron and said second layer is fabricated of permalloy comprising nickel and iron.

3. In a cable having at least one electrical conductor running therein, electro-magnetic shielding comprising an inner and outer shielding layer, each of said layers surrounding said wire, said inner and outer shielding layers being fabricated of a magnetic material having relatively low permeability and relatively good conductivity, and an intermediate shielding layer sandwiched between said inner and outer layers, said intermediate layer being fabricated of a magnetic material having relatively high permeability.

4. The cable as recited in claim 3 wherein said inner and outer shielding layers comprise a continuous sheet, said sheet being rolled to form a cylinder having overlapping edges running parallel to the longitudinal axis of said cylinder.

5. The cable as recited in claim 3 wherein said inner and outer shielding layers are fabricated of braided wire of substantially pure iron and said intermediate shielding layer is fabricated of braided permalloy wire comprising nickel and iron.

6. In a flexible cable having at least one electrical conductor running therein, electromagnetic shielding comprising an inner and outer shielding layer, each of said layers concentrically surrounding said wire, said inner and outer shielding layers being fabricated of braided wire of substantially pure iron, and an intermediate shielding layer sandwiched between said inner and outer layers, said intermediate layer being fabricated of braided wire of permalloy comprising nickel and iron, said inner and outer shielding layers comprising an endless sheet rolled to form a cylinder.

References Cited by the Examiner

UNITED STATES PATENTS

| | | | |
|---|---|---|---|
| 271,262 | 1/83 | Patterson | 174—106 |
| 1,719,479 | 7/29 | Legg | 174—108 |
| 1,871,906 | 8/32 | Nyquist. | |
| 2,097,501 | 11/37 | Reichelt | 156—54 |
| 2,526,942 | 10/50 | Fuchs | 174—36 X |
| 2,589,700 | 3/52 | Johnstone | 174—106 |
| 2,594,854 | 4/52 | Bloch | 174—36 X |
| 2,663,752 | 12/53 | Wier | 174—36 |
| 2,677,009 | 4/54 | Mascuch | 174—106 X |
| 2,691,058 | 10/54 | Millar | 174—36 |
| 2,955,968 | 10/60 | Henning | 156—54 |

JOHN F. BURNS, *Primary Examiner.*

LARAMIE E. ASKIN, *Examiner.*